Patented Feb. 2, 1943

2,309,664

UNITED STATES PATENT OFFICE 2,309,664

METHOD OF PREPARING GUANAMINES

Wilbur Null Oldham, Old Greenwich, Conn., assignor to American Cyanamid Company, New York, N. Y., a corporation of Maine No Drawing. Application August 30, 1941, Serial No. 409,150

12 Claims. (Cl. 260—248)

This invention relates to a method of preparing guanamines and more particularly guanamines substituted on the 2-carbon atom of the triazine ring by a relatively long aliphatic radical.

Guanamines having long aliphatic substituents on the 2-carbon atom of the triazine ring have achieved importance since by reaction with formaldehyde they can be used in textile finishes.

In the past it has been proposed to prepare guanamines and particularly long-chain guanamines by two general methods. The first involved reaction of biguanide or substituted biguanides with an acid chloride of the corresponding aliphatic acid. This process works smoothly and gives good yields in many cases but is open to the disadvantage that the acid chlorides are relatively expensive reagents. The second process involved the reaction of esters of fatty acids with lower monohydric alcohols. This process is also capable of giving good yields when a suitable condensation agent is employed such as a metal alkoxide but again the esters of the fatty acids and monohydric alcohols are relatively expensive. It had been thought that the esters of lower monohydric alcohols gave much better results than the higher molecular alcohol ester. I have found, however, that contrary to what had been assumed, good results can be obtained by reacting glycerides of fatty acids with biguanide using the same type of metal alkoxide catalyst or condensation agent. Since glycerine is a polyhydric alcohol, the esters are of high molecular weight, and although in general are far less reactive in most reactions than are the corresponding esters of monohydric alcohols, they are, however, the cheapest source of most fatty acids and represent, therefore, a raw material of great economic importance which hitherto had been considered unsuitable for the production of guanamines.

I do not know why the glycerides react as effectively as they do in spite of their normally lower reactivity and the present invention is not intended to be limited to any theory of action.

The present invention is applicable to all glycerides of aliphatic acids. However, the economic importance is much greater in the case of the long chain glycerides because these are the compounds that are normally obtained in nature and present the greatest economic advantages. Therefore, while the invention is not limited to the use of glycerides of higher fatty acids, these constitute the preferred embodiment.

Many glycerides are obtained in nature in the form of mixtures. In fact it is the exception to find in nature a pure glyceride of a single fatty acid. It is an advantage of the present invention that the process is applicable not only to pure glycerides of a single fatty acid, but also to mixtures. This permits the use of the cheap mixed glycerides that are obtainable from natural products and greatly reduces the cost of producing guanamines. In some cases where it may be desirable to have a certain proportion, partial separation of the glycerides may be effected whereby fractions differing in one or other of the components are obtained. The extreme flexibility of the process with regard to raw materials makes it possible to obtain guanamines of various physical properties from cheap raw materials.

In carrying out the preparation of the guanamines of the present invention it is not necessary to use biguanide itself, but substituted biguanides such as phenyl biguanide, allyl biguanide, dimethyl biguanide, and the like may be used, in which case the corresponding N-substituted guanamines are produced. However, the most important 2-alkyl substituted guanamines of the present invention are those prepared with unsubstituted biguanide in which case the two amino groups in the 4- and 6-positions of the triazine ring are free, and in a more specific aspect these are the preferred compounds of the present invention.

The reaction of glycerides with biguanide and particularly with substituted biguanides is too slow in most cases to be economically practical and therefore it is desirable to use a condensing agent. The best condensing agents are the metal alkoxides and the compounds which in alcohol solutions will yield alkoxides. Typical compounds are sodium methoxide, ethoxide, aluminum isopropoxide, sodamide, and the like.

The optimum amount of alkoxide or other basic condensing agent will vary to some extent with different glycerides. In general it has been found that it is ordinarily desirable to use somewhat less of the alkoxide than that corresponding to stoichiometrical equivalents, whereas in the case of esters of monohydric alcohols it is usually desirable to use stoichiometrical equivalents. When a large amount of the condensing agent is used it reacts with some of the glyceride producing a soap which is not very soluble in the solvent mixture and which if present in excess amounts tends to be precipitated and interfere with the recovery of the guanamine. I do not know whether there is any particular chemical difficulty involved or whether the use of excess condensing agent merely introduces an operational difficulty. It is not intended to limit this modification to any particular theory of action. I believe, however, that at least the primary factor is the operational difficulty produced by the presence of additional solid.

Biguanide and substituted biguanides may be dispersed in the glyceride where the latter is a liquid, but in general it is preferable to use a solvent. The present invention is not limited to any particular solvent, but I have found that the liquid monohydric alcohols are very effective and cheap and are therefore preferred. The choice of alcohol is affected to some extent by the glyceride used. The lower monohydric alcohols such as ethanol and methanol are excellent solvents for biguanide and substituted biguanides. However, they do not show as high a solubility for some of the glycerides notably the saturated glycerides. Somewhat higher molecular weight monohydric alcohols show higher solubility for glycerides, for example butyl or amyl alcohol, but are somewhat more expensive. I have found that a very effective compromise in many cases is to use a mixed solvent having a lower monohydric alcohol such as methanol or ethanol mixed with a sufficient amount of a hydrocarbon solvent such as toluene or the like, which confers some additional solubility for some of the saturated glycerides. The solvent is essentially inert in its action and therefore any suitable mixture can be employed preferably using the cheaper alcohols and hydrocarbons.

The invention will be described in greater detail in conjunction with the following specific examples in which the parts are by weight.

*Example 1*

10 parts of biguanide and 50 parts of olive oil are dissolved in about 275 parts of ethanol containing 2.3 parts of sodium, and the solution allowed to stand. After several days the solution is filtered and the solid discarded. The filtrate is treated with excess sulfuric acid and the guanamine sulfate which precipitates is washed with water. The free guanamine base is prepared by treatment with alcohol containing ammonium hydroxide and 12 parts of the product having a melting point of 83° is obtained. On recrystallization the product gives a melting point of 87° C.

*Example 2*

10 parts of biguanide and 50 parts of linseed oil are dissolved in a mixture of 50 parts of butanol and 80 parts of methanol and refluxed for 12½ hours. A small amount of insoluble material is filtered off and an excess of sulfuric acid added. The mixture is then heated to about 80° C., filtered, and cooled to precipitate guanamine sulfate. The free guanamine base is obtained by dissolving the sulfate in about 70 parts of hot ethanol, adding an excess of ammonium hydroxide, and precipitating the free base by dilution with water. A 30% yield of the product is obtained which on recrystallization from acetone has a melting point of 106° C.

*Example 3*

10 parts of biguanide and 50 parts of linseed oil are dissolved in about 100 parts of butanol containing .23 part of sodium and the solution allowed to stand at room temperature for three days. The solution is then made acid by the addition of sulfuric acid, heated to boiling and the insoluble material filtered off. Guanamine sulfate crystallizes out on cooling, is filtered off and the free base obtained by treatment with alcohol solution containing ammonium hydroxide. The yield was 41% of theory.

*Example 4*

10 parts of biguanide is dissolved in about 90 parts of methanol containing .23 part of sodium and this solution is added to a solution of 50 parts of a hydrogenated glyceride in 200 parts of toluene. The mixture is stirred for 1½ days, treated with excess sulfuric acid, and the precipitated guanamine sulfate washed with toluene. The sulfate is recrystallized from 450 parts ethanol yielding 25 parts of the pure guanamine sulfate. The free base is prepared by treatment with alcohol containing ammonium hydroxide and the desired product obtained by dilution with water. After recrystallization from acetone it melts at 115° C.

What I claim is:

1. A method of preparing 2-substituted guanamines which comprises reacting a biguanide with a glyceride of an aliphatic acid.

2. A method of preparing 2-substituted guanamines which comprises reacting biguanide with a glyceride of an aliphatic acid.

3. A method of preparing a long chain 2-substituted guanamine which comprises reacting a biguanide with a glyceride of a long chain aliphatic acid.

4. A method of preparing a long chain 2-substituted guanamine which comprises reacting biguanide with a glyceride of a long chain aliphatic acid.

5. A method according to claim 1 in which the reaction takes place in solution in a lower monohydric alcohol.

6. A method according to claim 2 in which the reaction takes place in solution in a lower monohydric alcohol.

7. A method according to claim 3 in which the reaction takes place in solution in a lower monohydric alcohol.

8. A method according to claim 4 in which the reaction takes place in solution in a lower monohydric alcohol.

9. A method according to claim 1 in which the reaction takes place in solution in an aromatic hydrocarbon.

10. A method according to claim 2 in which the reaction takes place in solution in an aromatic hydrocarbon.

11. A method according to claim 3 in which the reaction takes place in solution in an aromatic hydrocarbon.

12. A method according to claim 4 in which the reaction takes place in solution in an aromatic hydrocarbon.

WILBUR NULL OLDHAM.